(12) United States Patent
Vokey

(10) Patent No.: US 7,554,345 B2
(45) Date of Patent: Jun. 30, 2009

(54) METHOD AND APPARATUS TO DETECT AND LOCATE DAMAGE AND BREACHES IN ROOF MEMBRANES

(75) Inventor: David E. Vokey, Sidney (CA)

(73) Assignee: Detec Systems LLC, Sidney, British Columbia (CA)

( * ) Notice: Subject to any disclaimer, the term of this patent is extended or adjusted under 35 U.S.C. 154(b) by 86 days.

(21) Appl. No.: 11/949,437

(22) Filed: Dec. 3, 2007

(65) Prior Publication Data
US 2009/0139178 A1    Jun. 4, 2009

(51) Int. Cl.
*G01R 27/08* (2006.01)
*G01R 31/08* (2006.01)
*G08B 21/00* (2006.01)

(52) U.S. Cl. ............ 324/718; 324/522; 324/71.1; 340/605

(58) Field of Classification Search ............ 324/522, 324/512, 500, 718, 713, 691, 649, 600, 456, 324/216, 237, 238, 240, 715; 73/592, 1.17; 702/35, 36; 340/605, 539.22
See application file for complete search history.

(56) References Cited

U.S. PATENT DOCUMENTS

| | | | | |
|---|---|---|---|---|
| 4,110,945 A | * | 9/1978 | Sheahan | ............ 52/173.1 |
| 4,565,965 A | | 1/1986 | Geesen | |
| 4,598,273 A | * | 7/1986 | Bryan et al. | ............ 340/539.26 |
| 5,081,422 A | * | 1/1992 | Shih | ............ 324/693 |
| 6,144,209 A | * | 11/2000 | Raymond et al. | ............ 324/512 |
| 6,267,000 B1 | * | 7/2001 | Harper et al. | ............ 73/40.5 R |
| 2008/0143349 A1 | * | 6/2008 | Lorenz et al. | ............ 324/691 |
| 2009/0044595 A1 | * | 2/2009 | Vokey | ............ 73/1.17 |

FOREIGN PATENT DOCUMENTS

| | | |
|---|---|---|
| CA | 2606466 | 11/2006 |
| DE | 3701130 A1 * | 7/1988 |
| DE | 19914658 A1 * | 11/2000 |

* cited by examiner

*Primary Examiner*—Vincent Q Nguyen
*Assistant Examiner*—Hoai-An D Nguyen
(74) *Attorney, Agent, or Firm*—Adrian D. Battison; Ade & Company Inc.

(57) ABSTRACT

A leak in a membrane on top of a horizontal roof deck is located by a manually operable carriage which is swept over the upper surface of the membrane on the roof deck. A measuring and switching circuit generates a voltage having a positive attached to the roof deck and a negative attached to conductive brushes on the carriage. The brushes are arranged to form an outer peripheral contact with an inner contact inside the outer contact. Thus the presence of a leak is detected by the outer set of conductive brushes at distance from the leak and by the inner conductive brush when directly over the leakage site.

27 Claims, 4 Drawing Sheets

TOP VIEW

BOTTOM VIEW

FRONT VIEW

METHOD AND APPARATUS TO DETECT AND LOCATE DAMAGE AND BREACHES IN ROOF MEMBRANES

The present invention relates to a system for testing roof membranes for damage to and breaches in roof membranes by detection and location of moisture penetration. It has particular application to testing the integrity of low-slope and flat roofs of residential and commercial buildings.

BACKGROUND OF THE INVENTION

The failure to detect, find and correct minor roof deterioration in the earliest stages is considered the greatest cause of premature roof failure. This is particularly true of roofing materials applied on low-slope or flat roofs. Costly roofing problems are often the result of design deficiencies or faulty application of the roof system. Even when properly designed and applied, all roofing materials deteriorate from contraction and expansion of roof decks and natural aging processes.

Several methods have been used to try and locate roof leaks after they have occurred. Electric capacitance meters identify leaks using a low-frequency that measures dielectric constant changes in the roofing material as a result of moisture below the membrane. Infrared cameras allow technicians to scan roof surfaces for temperature differentials that signify moist areas through changes in thermal conductivity or evaporation. Electric field vector mapping uses a wire loop around the perimeter of the roof surface to introduce an electric potential between the structural deck and a selected roof area which is sprayed with water. The electric field potential caused by a conductive path to any roof membrane damage is then located using a sensitive voltmeter and a pair of probes.

U.S. Pat. No. 4,565,965 issued Jan. 21, 1986 to Geesen discloses an arrangement for detecting leaks in flat roofs in which electrical pulses are transmitted through the moisture in the leak to the roof edge and then the roof is scanned by a pulse sensor and hand-held probe rods to find the leak by locating the maximum amplitude.

The method as described by Geesen requires considerable experience and careful placement of a wire loop around the perimeter of the area to be tested. In particular, metal roof stacks and drains must be isolated by placing secondary loops around them to avoid false readings pointing towards these penetrations.

SUMMARY OF THE INVENTION

It is an object of the present invention to provide an apparatus and method for testing roof membranes for damage to and breaches in roof membranes by detection and location of moisture penetration in a flat or low slope roof construction of the type having an impermeable membrane applied over an underlying horizontal deck.

According to a first aspect of the invention there is provided a method of detecting a leak in a roof, where the roof comprises a generally horizontal roof support deck with a water impermeable membrane applied onto the upper surface of the support deck, the method comprising:

providing a first conductor arrangement for engaging the roof above the membrane;

providing a return conductor arrangement for connecting to the support deck;

providing a measuring and switching circuit for generating an electrical potential between the first and return conductor arrangements;

mounting the first conductor arrangement on a carriage which can be moved over the roof so as to scan the first conductor arrangement over selected areas of the roof;

operating the circuit to sense the current flowing from the roof support deck to the first conductor arrangement;

and detecting the changes in current as the first conductor arrangement is scanned over the selected areas of the roof to locate the leak in the membrane.

Preferably the carriage is mounted on roller wheels for carrying the carriage in rolling movement over the roof. However a sliding action without wheels is possible or other transport devices such as rollers may be used.

Preferably the carriage includes a handle such that the carriage can be manually rolled across the roof. However the device may be propelled by other arrangements including robotically.

Preferably the first conductor arrangement comprises at least one conductive component arranged for engaging the roof and for sliding over the roof while in contact therewith. This may be a conductive brush with conductive flexible bristles but other flexible conductive members may be used.

Such a member may include a vertically floating support to maintain intimate contact with the roof while accommodating variances in the roof surface.

Preferably the first conductor arrangement includes first and second conductor members which are electrically isolated each other. Preferably the circuit includes first and second circuit sections arranged to independently sense the current flowing from the roof support deck to the first and second conductor members and to detect the changes in current as the first conductor arrangement is scanned over the selected areas of the roof to locate the leak in the membrane. Preferably the circuit includes two independent leakage current detection components sharing a common power supply source.

Preferably the first conductor member is an inner member and the second member is a perimeter outer member such that both the first inner member and the second outer member engage the roof with the outer member peripherally surrounding the inner member. The outer member can be formed from four brushes in the form of an outer rectangle and the inner conductor may be one or more inner brushes contained within the outer periphery.

Preferably the circuit includes variable sensitivity of the changes and an output display for providing a visual indication of the changes to an operator.

According to a second aspect of the invention there is provided a method of detecting a leak in a roof, where the roof comprises a generally horizontal roof support deck with a water impermeable membrane applied onto the upper surface of the support deck, the method comprising:

providing a conductor arrangement for engaging the roof above the membrane;

wherein the conductor arrangement includes first and second conductor members which are electrically isolated each other;

wherein the first conductor member is an inner member and the second member is a perimeter outer member such that both the first inner member and the second outer member engage the roof with the outer member peripherally surrounding the inner member;

mounting the conductor arrangement on a carriage which can be moved over the roof so as to scan the first conductor arrangement over selected areas of the roof;

providing a circuit to sense the current flowing from the roof support deck to the conductor arrangement;

wherein the circuit includes two independent current detection components respectively for the first and second conductor members;

and detecting the changes in current as the conductor arrangement so that any leakage path through the roof membrane is detected by the first conductive member at distance from a leakage site and by the second conductive member when directly over the leakage site.

Preferably the circuit includes variable sensitivity of the changes and an output display for providing a visual indication of the changes to an operator so that the operator can detect the presence of a leak in the area of the device and an audible alert for indicating when the inner conductor member is over the leakage site.

According to a third aspect of the invention there is provided an apparatus for detecting a leak in a roof, where the roof comprises a generally horizontal roof support deck with a water impermeable membrane applied onto the upper surface of the support deck, the method comprising:

a conductor arrangement for engaging the roof above the membrane including first and second conductor members which are electrically isolated each other;

a carriage carrying the first and second conductor members which can be moved over the roof so as to scan the members over selected areas of the roof;

wherein the first conductor member is an inner member and the second member is a perimeter outer member such that both the first inner member and the second outer member each arranged for engaging the roof and for sliding over the roof while in contact therewith with the outer member peripherally surrounding the inner member;

a circuit arranged to sense current flowing from the roof support deck to the members, the circuit including two independent current detection components respectively for the first and second conductor members;

the circuit being arranged to detect changes in current as the conductor members are moved over the roof.

The device is used in a method in which a power supply potential is applied between the roof deck and the two sets of conductive brushes so that any leakage path through the roof membrane to the roof deck will be detected by the first set of conductive brushes at distance from the leak and by the second set of conductive brushes when directly over the leakage site. Usually the selected area to be tested is wetted while reading the outer perimeter display and then sweeping the platform in a covering pattern over the wetted area if the outer perimeter brush detection circuit indicates a leak. The sweeping process is halted and the area directly under the platform examined when the inner brush circuit indicates a leakage by a visual and/or audible response.

BRIEF DESCRIPTION OF THE DRAWINGS

One embodiment of the invention will now be described in conjunction with the accompanying drawings in which.

DETAILED DESCRIPTION OF THE PREFERRED EMBODIMENT

Figure 1:
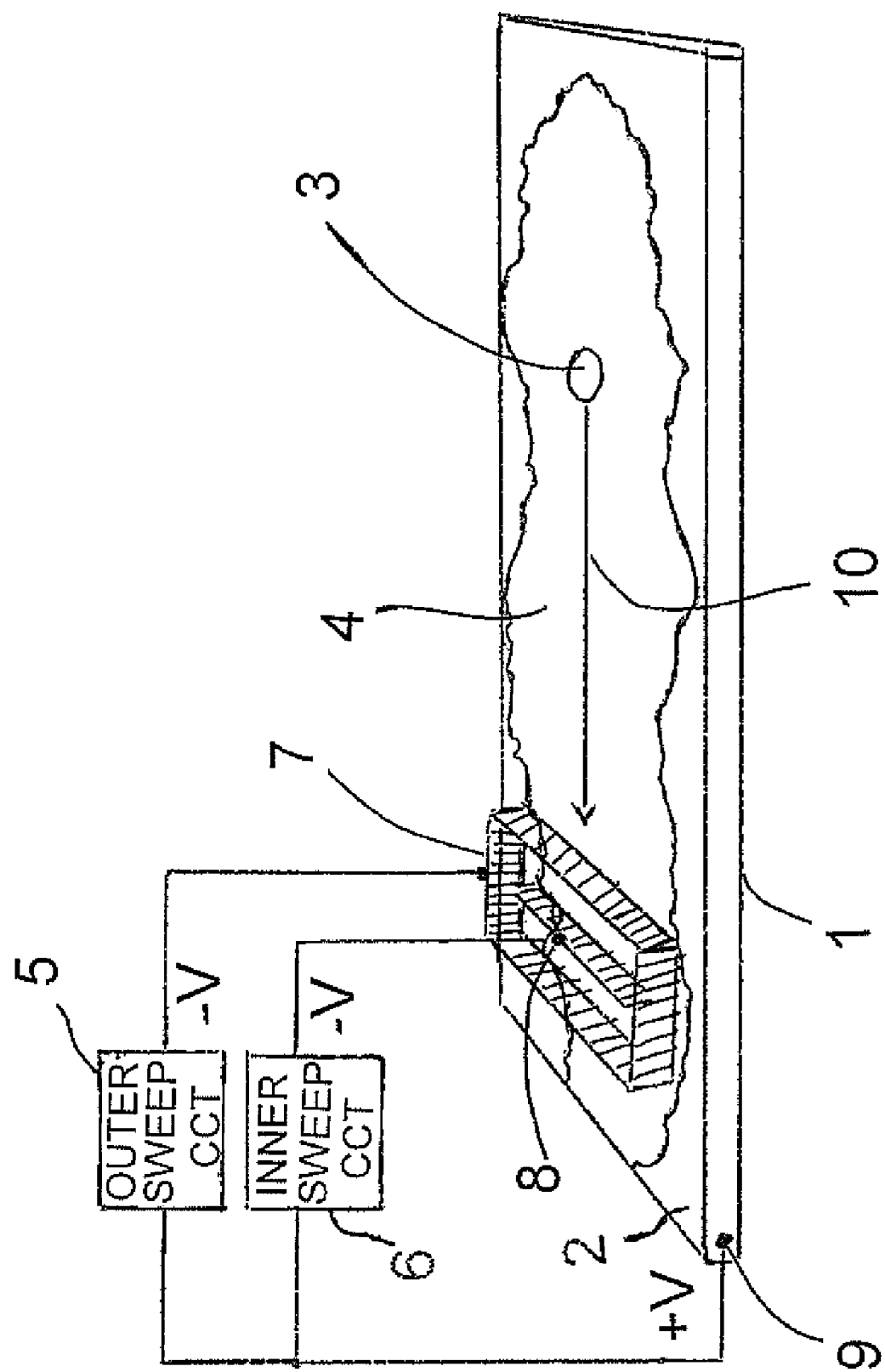
FIG. 1 is an isometric view of a roof membrane on a roof deck including a basic illustration of the sensor brushes and measurement circuits.

Referring now to the drawings, the overall arrangement of the subject roof membrane moisture detection system can best be seen with reference to FIG. 1. A roof membrane 2 is illustrated which is applied as a direct covering layer over a concrete roof deck 1. The deck is typically of concrete but can be of any suitable material to provide the necessary structural strength and can be steel or wood. The membrane is an impervious material such as plastics and is sealed at any joints to provide a continuous water barrier over the roof deck. This barrier is intended to provide the leak prevention and any penetration therein caused by a puncture or faulty seal or by wear can allow the moisture to penetrate to the deck where it can cause damage or can continue into the structure to cause damage to internal structures.

The membrane may be covered by a layer of an aggregate material for heat insulation and protection. If used, the aggregate may be loose or may contain a binder such as asphalt. The arrangement described herein can be used with various roof constructions they can range from directly adhered membranes with no ballast (aggregate) to fully built up roofs with gardens.

The basic operation is shown in FIG. 1. A typical concrete deck 1 over which the non-conducting water proof membrane 2 is applied is illustrated. A defect in the membrane 3 allows water 4 to intrude and forms a conductive path to the roof deck. The conductive outer 7 brushes and inner 8 brush are placed on the top surface of the membrane 2 with the outer perimeter conductive brushes 7 surrounding the inner brush 8. The brush sets are positioned so as to be in intimate contact with the wetted surface 4 of the test area. The outer sweep detection circuit 5 and inner sweep detection circuit 6 which share a common power supply are connected to the outer brush set 7 and inner brush set 8 respectively with the common positive side of both connected to a grounding point 9 on the deck.

A DC potential is applied between the roof deck 1 and the wetted area 4. At the membrane damage site 4 there is a conductive path through the membrane and a leakage current 10 travels through the damage point and back to the outer conductive brush 7. The return current picked up by the outer brushes is measured and displayed on the outer sweep circuit 5. As the outer brush perimeter surrounds the inner brush sensor, very little of the return current reaches the inner brush 8. The sweep system is then moved forward over the membrane towards the defect and when the outer brush passes over the damage site, the inner brush picks up the return current and provides a visual and audible alarm. The damage site is thereby located.

Figure 2:
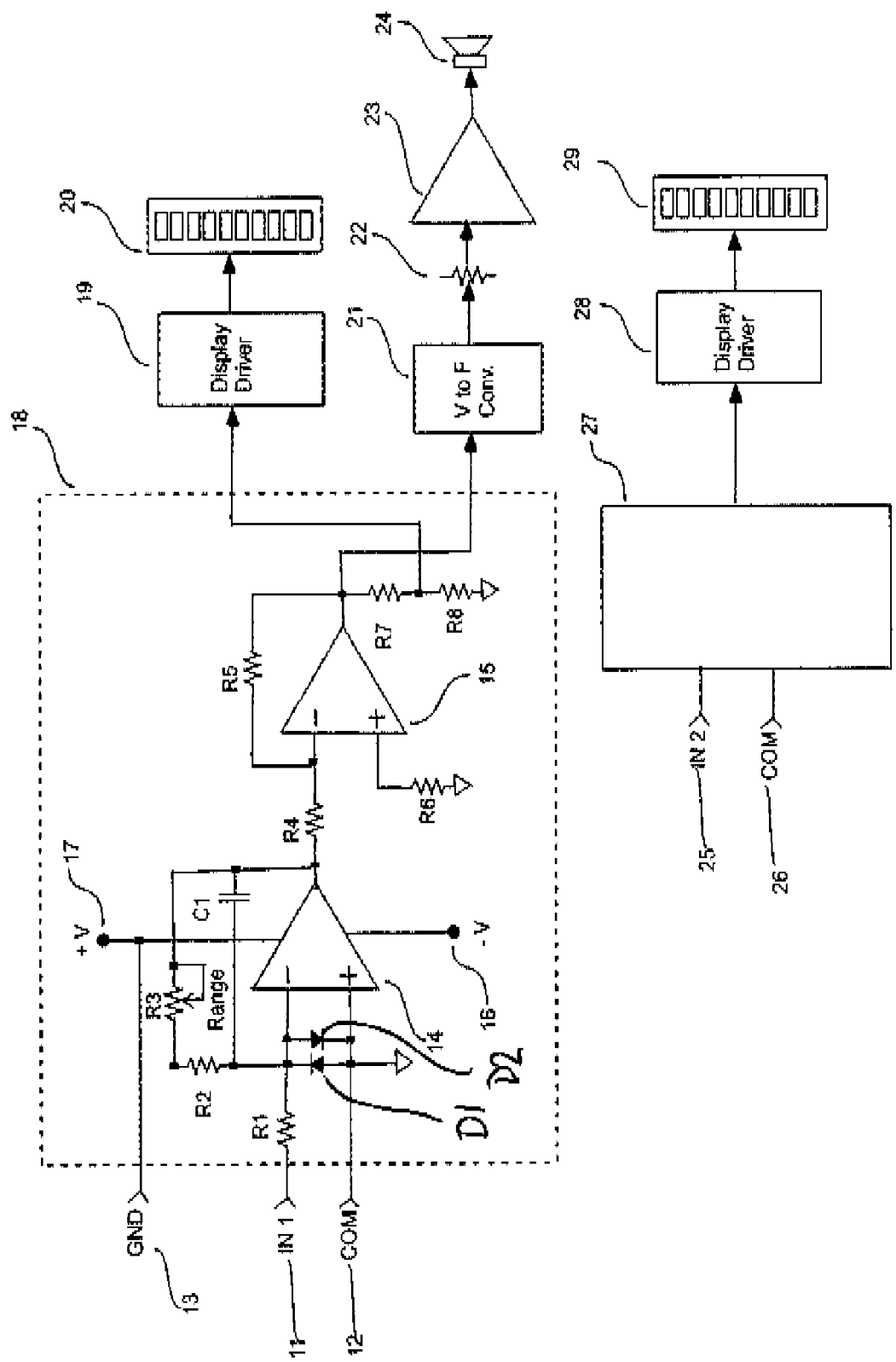
FIG. 2 is a circuit schematic.

A detailed schematic of the detector circuit is shown in FIG. 2. The roof deck connection 9 is connected to the ground terminal 13 which ties the connecting cable from roof deck to the positive supply 17 of the circuit. The connecting lead from the inner brush 8 is connected to the negative summing input of a first stage Amplifier 14. Diodes D1 and D2 provide input protection. The gain of the first stage is set by Resistors R2 and R3 while Capacitor C1 filters out any unwanted noise. The output of Amplifier 14 is tied to the input of a second Amplifier 15 through Resistor R4. Resistors R4, R5 set the gain of the second stage Amplifier to unity. The positive summing input of Amplifier 15 is tied to common through Resistor R6.

A voltage to frequency converter 21 has an input which is connected to the output of Amplifier 15. The output of the voltage to frequency converter is applied to the input of audio Amplifier 23 through volume control 22. The audio output of Amplifier 23 is connected to a speaker 24. The output of Amplifier 15 is applied to voltage divider defined by Resistors R7 and R8 which scales the signal level and applies it to the input of a display driver 19. The display driver 19 is connected to and drives an LED level display 20 of the inner brush.

The entire first and second stage input circuit 18 is duplicated in a second sensing system schematically indicated at 27. The connecting lead from the outer brushes 8 is connected to the input of the second amplifier circuit 27 as indicated at 25. The output of the circuit 27 is applied to display driver 28 which drives a LED level display 29 of the outer brush.

Figure 3A:
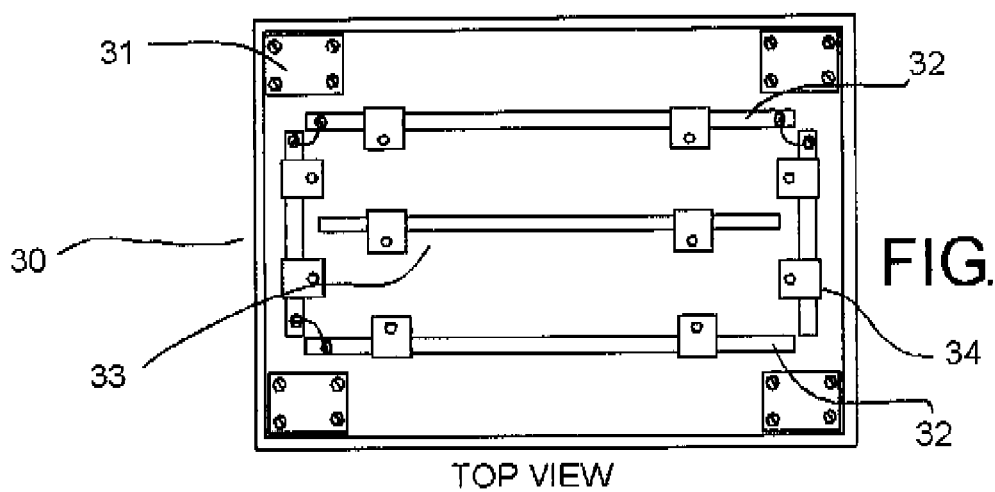
FIGS. 3A, 3B and 3C show respectively a top plan view, a bottom plan view and a front view of a carriage and sensing system for use in the general method of FIG. 1.
Figure 3B:
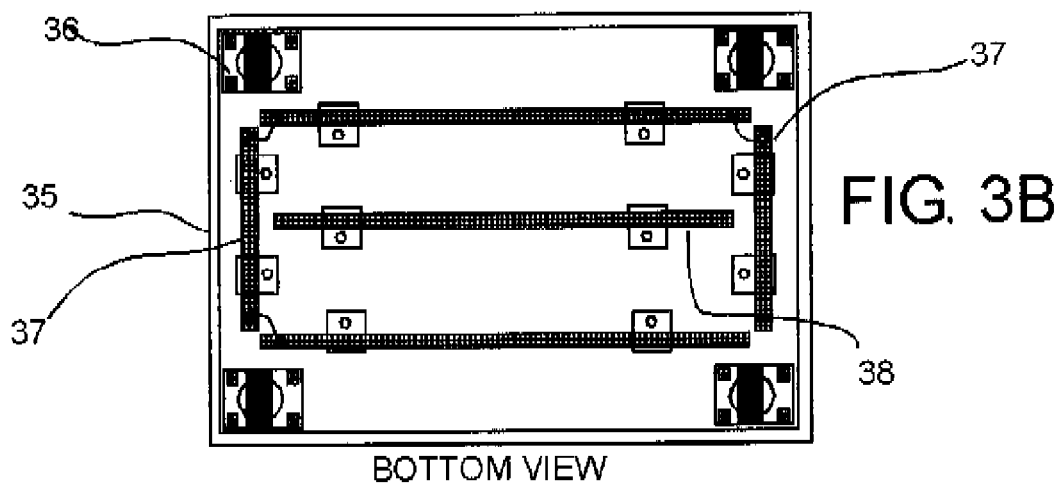
Figure 3C:
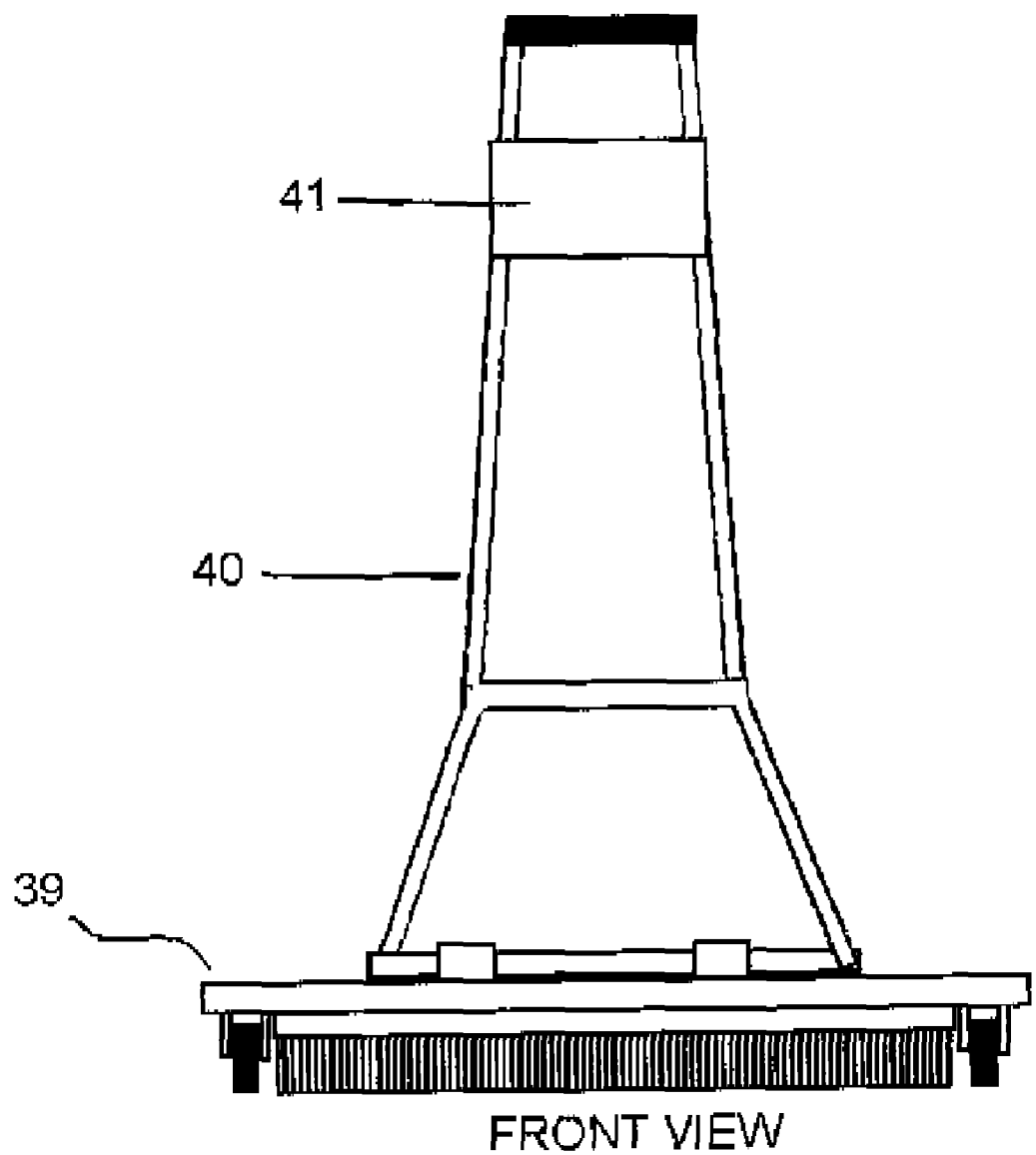

The mechanical arrangement of the apparatus is illustrated in FIG. 3. A horizontal platform or carriage 30 with a flat top wall and a depending side wall 35 forming four sides of a rectangular carriage. The carriage is carried on four swivel wheels or casters 31 attached to the top plate by mountings 36. The carriage supports an outer brush assemblies defined by two parallel front and rear brushes 32 and two parallel side brushes 37, thus defining a rectangular outer area just inside the outside wall of the carriage. Inside the outer rectangular area is provided a single transverse brush defining an inner brush 33. Vertically floating brackets 34 position the outer brushes and allow vertical movement of the brushes as the platform travels over the membrane surface. Similar brackets 38 carry the inner brush. The brushes are formed as a strip from conductive bristles carried on a base so that the base can float upwardly and downwardly from pressure of the roof against the tips of the bristles so that a constant electrical contact is maintained with the roof.

A simple manually graspable handle assembly 40 is attached to brackets 39 on the top plate of the carriage. The sweep circuits are mounted in a housing 41 and attached to the handle 40 assembly at a position below a top hand rail of the handle assembly.

The invention claimed is:

1. A method of locating a leak in a roof, where the roof comprises a generally horizontal roof support deck with a water impermeable membrane applied onto the upper surface of the support deck, the method comprising:
    providing a first conductor arrangement for engaging the roof above the membrane;
    providing a return conductor arrangement for electrical connection to the support deck;
    generating an electrical potential between the first and return conductor arrangements;
    mounting the first conductor arrangement on a carriage which can be moved over the roof so as to scan the first conductor arrangement over selected areas of the roof while the first conductor arrangement remains in contact with the roof as the carriage is moved;
    sensing the current flowing from the roof support deck to the first conductor arrangement;
    and detecting the changes in current as the first conductor arrangement is scanned over the selected areas of the roof to locate the leak in the membrane.

2. The method according to claim 1 wherein the carriage is mounted on roller wheels for carrying the carriage in rolling movement over the roof.

3. The method according to claim 1 wherein the carriage includes a handle such that the carriage can be manually rolled across the roof.

4. The method according to claim 1 wherein the first conductor arrangement comprises at least one conductive component arranged for engaging the roof and for sliding over the roof while in contact therewith.

5. The method according to claim 4 wherein the conductive component comprises a conductive brush.

6. The method according to claim 1 wherein the first conductor arrangement includes first and second conductor members which are electrically isolated from each other, wherein an electrical potential is arranged to be applied between the first conductor member of the first conductor arrangement and the roof support deck and between the second conductor member of the first conductor arrangement and the roof support deck and wherein the current flowing from the roof support deck to the first and second conductor members is independently sensed to detect the changes in current as the first conductor arrangement is scanned over the selected areas of the roof to locate the leak site in the membrane.

7. The method according to claim 6 wherein there is provided a measuring and switching circuit which includes two independent leakage current detection components sharing a common power supply source.

8. The method according to claim 6 wherein the first conductor member is an inner member and the second member is an outer shielding member surrounding the first inner member with both the first inner member and the second outer member engaging the roof.

9. The method according to claim 1 wherein the first conductor arrangement includes a vertically floating support to maintain intimate contact with the roof while accommodating variances in the roof surface.

10. The method according to claim 1 wherein the circuit includes variable sensitivity of the changes and an output display for providing a visual indication of the changes to an operator.

11. The method according to claim 1 wherein the circuit includes an audible alert.

12. A method of locating a leakage site in a roof, where the roof comprises a generally horizontal roof support deck with a water impermeable membrane applied onto the upper surface of the support deck, the method comprising:
    providing a first conductor arrangement for engaging the roof above the membrane;
    providing a return conductor arrangement for electrical connection to the roof support deck;
    wherein the first conductor arrangement includes first and second conductor members which are electrically isolated from each other;
    wherein the first conductor member is an inner member and the second member is an outer shielding member at least partly surrounding the first inner member;
    generating an electrical potential between the first conductor member of the first conductor arrangement and the roof support deck;
    generating an electrical potential between the second conductor member of the first conductor arrangement and the roof support deck;
    scanning the first conductor arrangement over selected areas of the roof such that both the first inner member and the second outer member engage the roof as the first conductor arrangement is scanned;
    independently sensing the current flowing from the roof support deck to the first and second conductor members of the first conductor arrangement;
    and locating the leakage site by:
        detecting changes in the sensed current received by the second outer conductor member at a distance from the leakage site with the second outer conductor member shielding the first inner conductor member to reduce communication of current thereto from the leakage site;
        and detecting the changes in the sensed current received by the first inner conductor member when the first inner conductor member is over the leakage site and the second outer shielding conductor member acts as a shield around the leakage site.

13. The method according to claim 12 wherein the first conductor arrangement is mounted on a carriage which can be moved over the roof so as to scan the first conductor arrangement over selected areas of the roof while the first and second conductor members remain in contact with the roof as the carriage is moved.

14. The method according to claim 13 wherein the carriage is mounted on roller wheels for carrying the carriage in rolling movement over the roof and wherein the carriage includes a handle such that the carriage can be manually rolled across the roof.

15. The method according to claim 12 wherein the first and second conductor members each are arranged for engaging the roof and for sliding over the roof while in contact therewith.

16. The method according to claim 12 wherein the conductor members each comprise a conductive brush.

17. The method according to claim 12 wherein the conductor members each include a vertically floating support to maintain intimate contact with the roof while accommodating variances in the roof surface.

18. The method according to claim 12 wherein the current is independently sensed by a circuit which includes variable sensitivity of the changes and an output display for providing a visual indication of the changes to an operator.

19. The method according to claim 12 wherein the current is independently sensed by a circuit which includes an audible alert for indicating when the inner conductor member is over the leakage site.

20. The method according to claim 12 wherein the potential applied across the conductive detectors and the roof deck when selected and across the conductive detectors and the roof deck when not selected is substantially the same.

21. Apparatus for locating a leak in a roof, where the roof comprises a generally horizontal roof support deck with a water impermeable membrane applied onto the upper surface of the support deck, the apparatus comprising:

a conductor arrangement for engaging the roof above the membrane including first and second conductor members which are electrically isolated each other;

a carriage carrying the first and second conductor members which can be moved over the roof so as to scan the members over selected areas of the roof;

wherein the first conductor member is an inner member and the second member is an outer shielding member at least partly surrounding the first inner member with both the first inner member and the second outer member engaging the roof;

and a circuit arranged to sense current flowing from the roof support deck to each of the first and second members, the circuit including two independent current detection components respectively for the first and second conductor members;

the circuit being arranged to detect changes in current as the conductor members are moved over the roof.

22. The apparatus according to claim 21 wherein the carriage includes a handle such that the carriage can be manually rolled across the roof.

23. The apparatus according to claim 21 wherein the conductor members each comprise a conductive brush.

24. The apparatus according to claim 21 wherein the conductor members each include a vertically floating support to maintain intimate contact with the roof while accommodating variances in the roof surface.

25. The apparatus according to claim 21 wherein the circuit includes variable sensitivity of the changes and an output display for providing a visual indication of the changes to an operator.

26. The apparatus according to claim 21 wherein the circuit includes an audible alert for indicating when the inner conductor member is over the leakage site.

27. The apparatus according to claim 21 wherein the carriage is mounted on roller wheels for carrying the carriage in rolling movement over the roof.

* * * * *